(12) United States Patent
Saxena et al.

(10) Patent No.: US 11,379,151 B2
(45) Date of Patent: Jul. 5, 2022

(54) FLOW CONTROL OF LARGE SEQUENTIAL HOST READ COMMANDS BASED ON A QUEUE THRESHOLD

(71) Applicant: WESTERN DIGITAL TECHNOLOGIES, INC., San Jose, CA (US)

(72) Inventors: Vishwas Saxena, Karnataka (IN); Abhijit K Rao, Karnataka (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 150 days.

(21) Appl. No.: 16/836,454

(22) Filed: Mar. 31, 2020

(65) Prior Publication Data

US 2021/0303206 A1 Sep. 30, 2021

(51) Int. Cl.
*G06F 3/06* (2006.01)
*G06F 12/10* (2016.01)

(52) U.S. Cl.
CPC .......... *G06F 3/0659* (2013.01); *G06F 3/0604* (2013.01); *G06F 3/0673* (2013.01); *G06F 12/10* (2013.01); *G06F 2212/657* (2013.01)

(58) Field of Classification Search
CPC .... G06F 3/0659; G06F 3/0604; G06F 3/0673; G06F 12/10; G06F 2212/657; G06F 2212/1016; G06F 2212/1032; G06F 2212/7201; G06F 2212/7206; G06F 2212/7208; G06F 3/061; G06F 3/0679; G06F 12/0246
USPC .......................... 710/39, 52, 56, 57; 711/154
See application file for complete search history.

(56) References Cited

U.S. PATENT DOCUMENTS

| | | | |
|---|---|---|---|
| 8,769,232 B2 | 7/2014 | Suryabudi et al. | |
| 10,303,366 B2 | 5/2019 | Jeong et al. | |
| 10,303,384 B1 | 5/2019 | Agarwal | |
| 2007/0168321 A1* | 7/2007 | Saito | G06F 3/0679 |
| 2009/0300234 A1* | 12/2009 | Haga | G06F 5/12 |
| | | | 710/56 |
| 2010/0332696 A1* | 12/2010 | Muppirala | G06F 13/1642 |
| | | | 710/39 |
| 2012/0221767 A1 | 8/2012 | Post et al. | |

(Continued)

OTHER PUBLICATIONS

Kim et al., "Efficient Flash Memory Read Request Handling Based on Split Transactions", Proceedings of International Workshop on Software Support for Portable Storage, (2009).

*Primary Examiner* — Hong C Kim
(74) *Attorney, Agent, or Firm* — ArentFox Schiff LLP

(57) ABSTRACT

Aspects of a storage device are provided which use flow control to prevent stalling during processing of read requests for a large read command. A controller of the storage device receives a read command for data from a host device, stores in a queue read requests for a portion of the data, and reads the portion of the data from a memory based on the read requests. The controller may store other read requests in the queue for other portions of the data when a number of read requests in the queue does not meet a threshold. Otherwise, the controller refrains from storing other read requests in the queue for other portions of the data when the number of read requests in the queue meets the threshold. The controller may operate similarly with subsequent sequential commands, but may continue to store read requests in the queue for subsequent random commands.

20 Claims, 7 Drawing Sheets

(56) References Cited

U.S. PATENT DOCUMENTS

| | | | |
|---|---|---|---|
| 2014/0258654 A1* | 9/2014 | Mori | G06F 3/0641 |
| | | | 711/159 |
| 2016/0139822 A1* | 5/2016 | Kondo | G06F 12/0862 |
| | | | 711/103 |
| 2017/0285940 A1 | 10/2017 | Benisty et al. | |
| 2018/0018101 A1* | 1/2018 | Benisty | G06F 3/0659 |
| 2018/0260115 A1* | 9/2018 | Hara | G06F 3/0659 |
| 2021/0303470 A1* | 9/2021 | Virani | G06F 12/0853 |

\* cited by examiner

FLOW CONTROL OF LARGE SEQUENTIAL HOST READ COMMANDS BASED ON A QUEUE THRESHOLD

BACKGROUND

Field

This disclosure is generally related to electronic devices and more particularly to storage devices.

Background

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

A flash storage device may store control information associated with data. For example, a flash storage device may maintain control tables that include a mapping of logical addresses to physical addresses. This control tables are used to track the physical location of logical sectors, or blocks, in the flash memory. The control tables are stored in the non-volatile memory to enable access to the stored data after a power cycle.

Flash storage devices may receive commands from a host device with a large maximum data transfer size (MDTS), such a read command for 32 MB of video data. When such a large command is received, the flash storage device may break down the read command into smaller read requests each corresponding to a page of a die (e.g. 32 KB). These read requests may then be placed into a queue for processing, which may also be shared with error handling requests (e.g. error status reporting requests and parity information requests for failed reads).

However, as the size of the queue is generally limited (e.g. based on a number of dies), the queue may not be able to accommodate all the read requests for such large read commands. Therefore, the queue may rapidly become full with read requests, preventing error handling requests from being processed or placed in the queue. As a result, command timeout and blocked processing may occur until the flash storage device is reset during a power cycle, thus impacting the performance of the flash storage device.

SUMMARY

One aspect of a storage device is disclosed herein. The storage device includes a memory and a controller. The memory is configured to store data. The controller is configured to receive a read command for the data from a host device, to store in a queue at least one read request for a portion of the data, and to read the portion of the data from the memory based on the at least one read request. The controller is further configured to store other read requests in the queue for one or more other portions of the data when a number of the at least one read request in the queue does not meet a threshold. On the other hand, the controller is configured to refrain from storing the other read requests in the queue for the one or more other portions of the data when the number of the at least one read request in the queue meets the threshold.

Another aspect of a storage device is disclosed herein. The storage device includes a memory and a controller. The memory is configured to store first data and second data. The controller is configured to receive a first read command for the first data from a host device, to store in a queue at least one read request for a portion of the first data, and to read the portion of the first data from the memory based on the at least one read request. The controller is further configured to receive a second read command for the second data from the host device after the first read command, and to store other read requests in the queue for the second data when a number of the at least one read request in the queue does not meet a threshold. On the other hand, the controller is configured to refrain from storing the other read requests in the queue for the second data when the number of the at least one read request in the queue meets the threshold.

A further aspect of a storage device is disclosed herein. The storage device includes a memory and a controller. The memory is configured to store first data and second data. The controller is configured to receive a first read command for the first data from a host device, to store in a queue at least one read request for a portion of the first data, and to read the portion of the first data from the memory based on the at least one read request. The controller is further configured to receive a second read command for the second data from the host device after the first read command. The controller is configured to refrain from storing other read requests in the queue for one or more other portions of the first data, and to store at least one additional read request in the queue for the second data, when a number of the at least one read request in the queue meets a threshold.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
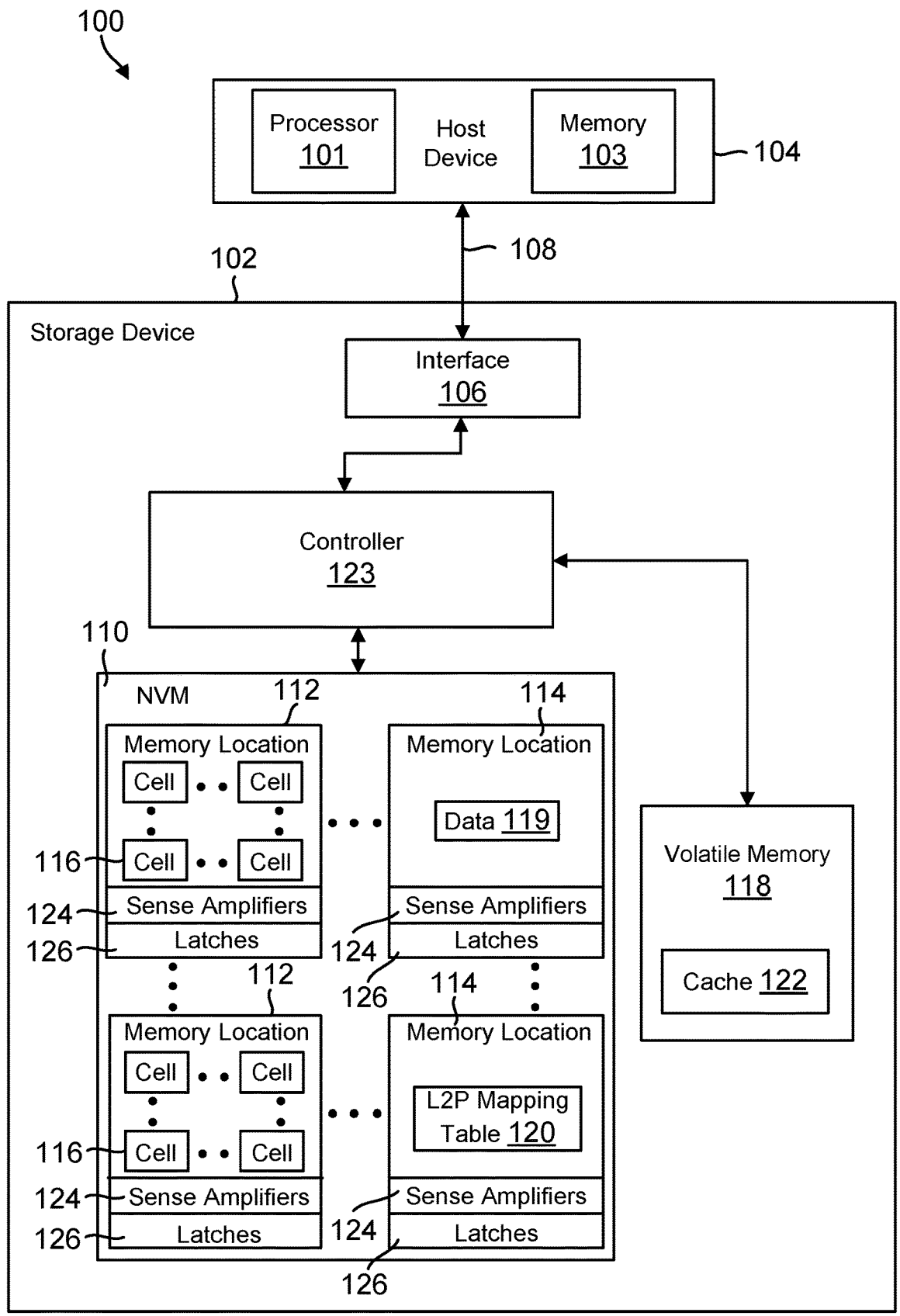
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

When a storage device receives a read command from a host device for video data, the read command may be received as one sequential command with a large MDTS. For example, a host device with large command buffers may split a 32 MB read command into multiple Physical Region Page (PRP) pointers or entries (e.g. 256 PRPs) that each correspond to a memory page size maximum (MPSMAX) (e.g. of 128 KB), and the storage device may fetch PRPs from the host device based on MPSMAX (e.g. 256 times) until the full 32 MB command is received. Such large command sizes are intended to result in lower Host Turn Around Time (HTAT) for greater storage device performance.

After the storage device receives the sequential read command, a controller of the storage device breaks down the command to smaller read requests each corresponding to a page size of a die (e.g. 32 KB). The controller then places the read requests in a queue for processing, e.g. in a static RAM (SRAM). Typically, a size of the queue is configured to be twice the number of dies in the storage device. Thus, when the storage device has 16 dies, a queue length of 32 read requests may be configured, although the queue size may be another number in other examples.

However, such queue size may not be able to support an entire sequential command with large MDTS. For instance, given a 32 KB page size and a queue size of 32 read requests (e.g. corresponding to 1024 KB of data), a read command of 32 MB may be split into 1024 read requests, which is significantly above the maximum queue size. As a result, the queue may quickly become full during execution of the read command, thus preventing other requests from being queued for processing. Moreover, the read requests in the queue may be shared with error handling requests (e.g. to report error status or to obtain a location of parity information for a failed physical page). Therefore, if the queue is full of read requests, the error handling requests may be unable to be placed in the queue for processing. Accordingly, processing of requests may be blocked (i.e. the storage device may stall), all commands may timeout, and a power cycle may be required to render the storage device operational again.

One possible approach to address this problem may be to increase the maximum queue size. However, such approach may be inefficient for large commands, since increasing the SRAM budget to accommodate the increased queue size may be impractical for lower-cost storage devices. Additionally, even with an increase in queue size, the problem may not be sufficiently addressed since continuous bursts of commands with large MDTS may eventually exhaust the queue in any event. For example, even if the queue size was increased from 32 to 1024 to accommodate read requests for a single 32 MB command, the same problem may still occur if that command is immediately followed by one or more additional 32 MB read commands.

Accordingly, the present disclosure addresses this problem by allowing the storage device to control the flow or processing of read commands with large MDTS to prevent read requests from being blocked from placement in the queue. In one example, when the controller of the storage device receives a sequential read command with a large MDTS (e.g. 32 MB), the controller may divide the command into portions (e.g. chunks of 512 KB or another number). The controller may dynamically determine the size of the portions based upon a utilization of the read request queues in different read workloads, e.g., the rate at which read commands are received from the host device and/or their respective command lengths. The controller may break down each portion or chunk into read requests each corresponding to a page size of a die (e.g. 32 KB), and the controller may place these read requests in the queue for processing, portion-by-portion, until the number of read requests in the queue meets a queue full threshold. The queue full threshold may be less than, or equal to, the maximum size of the queue. Once the queue full threshold is met, the controller may operate in a low resource mode, during which the controller refrains from processing the remaining portions of the current command (e.g. breaking them down into read requests and placing them in the queue) and from similarly processing new sequential commands until the existing read requests in the queue have been completed and the queue full threshold is no longer met. After various read requests have been completed such that the number of read requests in the queue no longer meets the queue full threshold, the controller may continue to process other portions of the current command and new commands as described above. In this way, large sequential commands may be divided into manageable chunks that are handled or blocked accordingly to prevent rapid overflowing of the queue, to allow room for possible error handling requests, and to enable completion of the read requests for such large commands without stalling the storage device.

Accordingly, in the first example described above, when the queue full threshold is not met (e.g. the queue is full), the controller may refrain from storing read requests in the queue for remaining portions of the current command and subsequent sequential commands. In another example, although the controller may still refrain from processing portions of the current command, the controller may allow processing of subsequent random commands when the queue full threshold is not met (e.g. when the threshold is less than the maximum size of the queue). For instance, the controller may determine whether the command size for a subsequent command is less than the portion size or greater than the portion size, and the controller may process or refrain from processing the subsequent command respectively based on the determination. As an example, if a subsequent command has a length less than or equal to 512 KB or another number, indicating the new command is for random data, the controller may process the new short command (e.g. breaking them down into read requests and placing them in the queue) even though the current large command is blocked from processing. Alternatively, if the subsequent command has a length greater than 512 KB or another number, indicating the new command is for sequential data, the controller may refrain from processing the new large command as previously described. In this way, short random commands may still be handled despite blocking of large sequential commands.

Accordingly, in the second example described above, when the queue full threshold is not met (e.g. part of the queue is full), the controller may refrain from storing read requests in the queue for remaining portions of the current command, but may continue to store read requests for a subsequent random command in the queue. In such case, the controller may handle the subsequent random command (e.g. move to the next command) after read requests have already been constructed for a current command or portion. However, in a further example, when no more portions of the current command are pending, the controller may move to the next command before constructing the read requests in response to identifying a logical-to-physical (L2P) mapping of the current command or portion. For example, if a last portion of a current sequential command is being processed or if a last or only portion of a current random command is being processed, the current command may be completed after obtaining the L2P mapping and after performing the read requests since there are no further portions pending. Therefore, in such case, the controller may move to the next random command upon obtaining the L2P mapping so that it may handle the next random command in parallel to executing the read requests for the current command. In this way, short random commands may optimally be handled simultaneously with large sequential commands.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

As shown in the exemplary embodiment of FIG. 1, the storage device 102 includes non-volatile memory (NVM) 110 for non-volatilely storing data received from the host 104. The NVM 110 can include, for example, flash integrated circuits, NAND memory (e.g., SLC memory, MLC memory, TLC memory, QLC memory, PLC memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the illustrated exemplary embodiment of FIG. 1, each memory location 112 may be a block 114 including multiple cells 116. The cells 116 may be single-level cells, multiple-level cells, triple-level cells, quadruple-level cells, and/or penta-level cells, for example. Other examples of memory locations 112 are possible; for instance, each memory location may be a die containing multiple blocks. Moreover, each memory location may include one or more blocks in a 3-D NAND array. Moreover, the illustrated memory locations 112 may be logical blocks which are mapped to one or more physical blocks.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a buffer (e.g. a write buffer or a read buffer) for temporarily storing data. While FIG. 1 illustrates the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116 of any of the memory locations 112. As an example, FIG. 1 illustrates data 119 being stored in one memory location, although the data may be stored in different memory locations. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
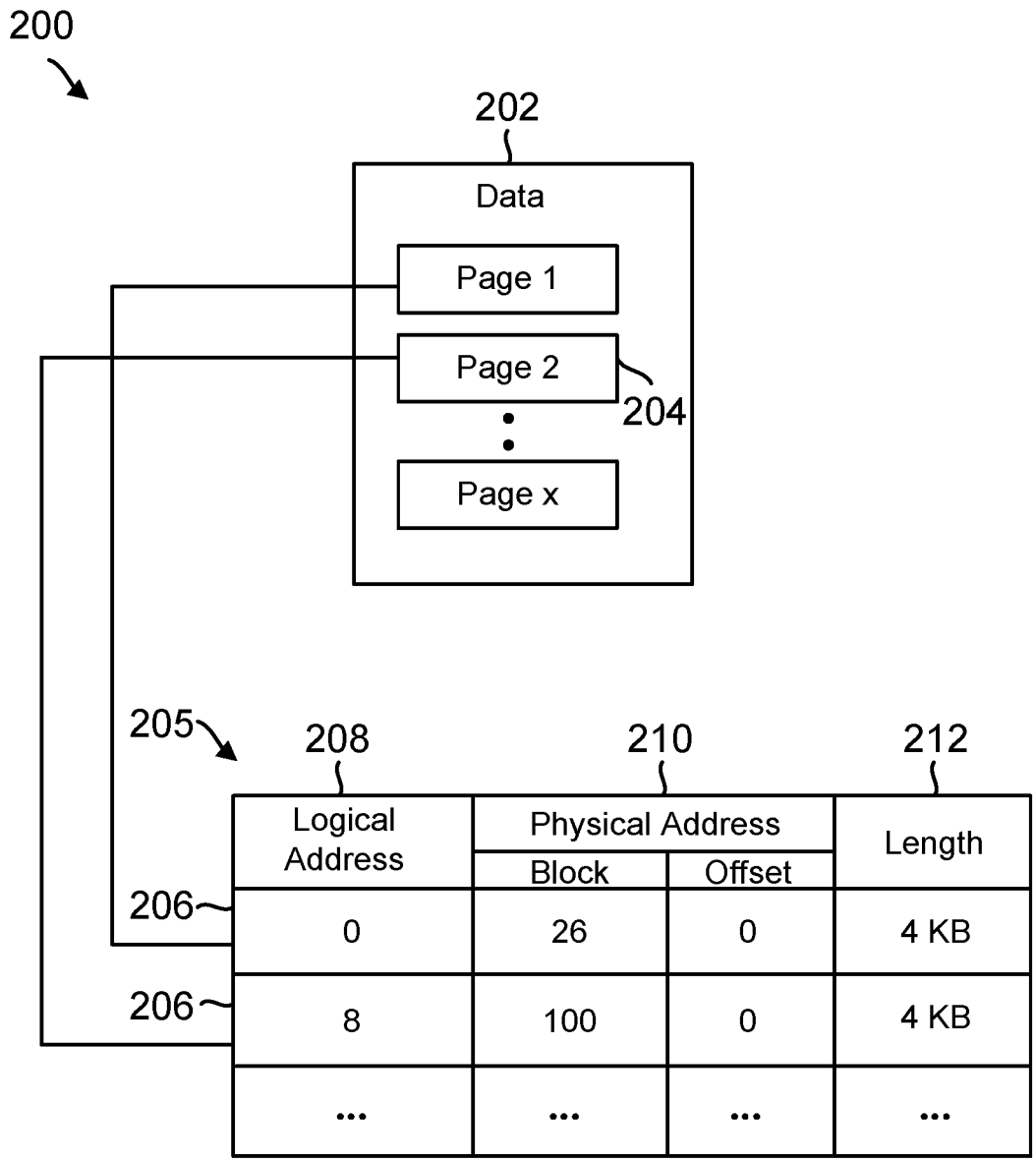
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 may store data temporarily as it is being written to, or read from, the NVM 110. For example, the cache 122 may store data received from the host device 104 until a certain length of data is accumulated for writing to one or more pages of the memory locations 112. Similarly, the cache 122 may store data read from the NVM until a certain length of data is accumulated for transferring to the host device.

The cache 122 may also include entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 may be further configured to access the memory locations 112 in parallel. For example the memory locations 112 may be blocks 114 stored on different dies of the NVM 110, and each die may be connected to the controller 123 by its own data bus. The controller may read or write data to the cells 116 on the different dies simultaneously over the multiple data buses. Additionally, the controller 123 may be configured to refrain from accessing the memory locations 112 in parallel, and may instead access the memory locations serially. For example, the controller may determine to read or write data to the cells 116 of a memory location in sequence rather than simultaneously over the multiple data buses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host 104 via the host interface 106.

Figure 3:
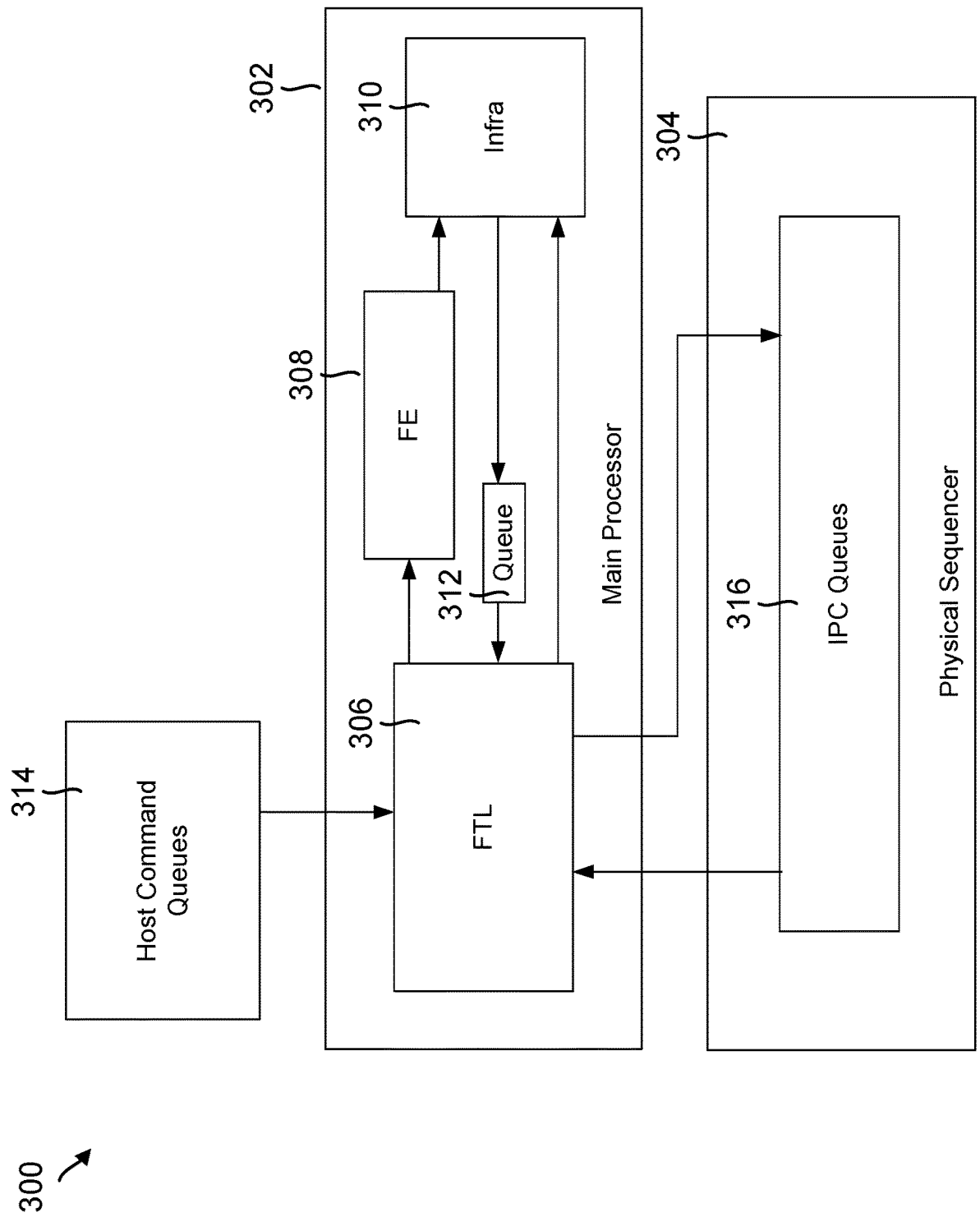
FIG. 3 is a conceptual diagram illustrating an example of controller architecture in the storage device of FIG. 1.

FIG. 3 illustrates an example of a controller architecture 300 for the controller of storage device 102 (e.g. controller 123). The controller architecture includes at least a main processor 302 and a physical sequencer 304. The main processor 302 may include a flash translation layer (FTL) 306, front end (FE) firmware 308, infrastructure (infra) firmware 310, and one or more queues 312, all of which perform various functions to operate the storage device. For example, the FTL 306 may receive host commands from a host interface module (HIM) (e.g. host interface 106) that are stored in host command queues 314. Host command queues 314 may include, for example, a random write queue, a sequential write queue, an overlap write queue, and a read queue, which may store commands that are received from a submission queue (not shown) of the host device 104. The FTL 306 may process each command in host command queues 314 by identifying logical addresses (e.g. logical address 208), translating the logical addresses to physical addresses (e.g. physical address 210), and constructing read, write, or erase requests associated with the physical addresses in the NVM (e.g. NVM 110). The FTL 306 may also interface with FE firmware 308 for handling certain NVM commands, and with the infra firmware 310 for handling power, thermal management and internal file system operations. The FE firmware 308 and infra firmware 310 may construct requests which may be stored in the queues 312 for the FTL 306 to process.

When processing the aforementioned commands or operations, the FTL 306 may send constructed requests to low-level firmware (e.g. the physical sequencer 304) to be processed. The physical sequencer 304 may generate low-level NAND sequences and interact with a flash interface module (FIM) to handle the read, write, and erase requests from the FTL 306. For example, when processing a read command from the host device, the physical sequencer 304 may receive read requests associated with one or more physical addresses from the FTL 306 and transmit signals (e.g. sequences) to the FIM to sense the data 119 from the cells 116 in the NVM 110. Similarly, when processing a write command from the host device, the physical sequencer may receive write requests associated with one or more physical addresses from the FTL 306 and transmit signals to the FIM to program data into the cells 116 in the NVM. The physical sequencer 304 may also perform error handing, e.g. by reporting error statuses to the FTL 306 when a failure is detected during a data read or write and by obtaining parity information locations for correcting errors in failed page reads or writes.

The physical sequencer 304 may be a different processor of the controller (e.g. a separate central processing unit (CPU)) than the main processor 302. Thus, when the physical sequencer 304 receives read, write, or erase requests from the FTL 306, the requests may be received via inter-processor communication (IPC) in IPC queues 316 for the physical sequencer to individually process. For example, IPC queues 316 may include normal priority queues (e.g. for reading or writing to open blocks), high priority queues (e.g. for closed blocks), relocation read queues, and other queues. IPC queues 316 may also be used for error handling, such as when performing error correction using Reed-Solomon (RS) codes and Find Last Good Page (FLGP) scans. IPC queues 316 may further include a completion mailbox (e.g. a completion queue), which shares completions of requests to the FTL 306 to be shared with the host device 104 (along with the submission queues).

Thus, the FTL 306 may be triggered to process messages received in queues 312, 314, 316. For instance, the FTL 306 may be triggered to process error reports or parity information requests, certain NVM commands, and power, thermal management, or internal file system operations as received in the queues (e.g. from the physical sequencer 304, the FE firmware 308 and the infra firmware 310). Accordingly, the FTL 306 may operate in a FTL main loop (FML), in which the FTL may wait for events such as the above triggers while it processes host commands received in the host command queues 314. For instance, if the FTL 306 receives a read command from the host command queue 314 while in the FML, the FTL may perform a host read flow (HRF) in which the FTL processes the read command as described above. As an example, during a HRF, the FTL may identify the logical address 208 associated with the read command, perform a storage address translation (SAT) to translate the logical address to its corresponding physical address 210, construct read requests associated with the physical address 210, and send the read requests to the physical sequencer 304 to be processed. Each read request may correspond to a page of a die (e.g. 32 KB).

Figure 4:
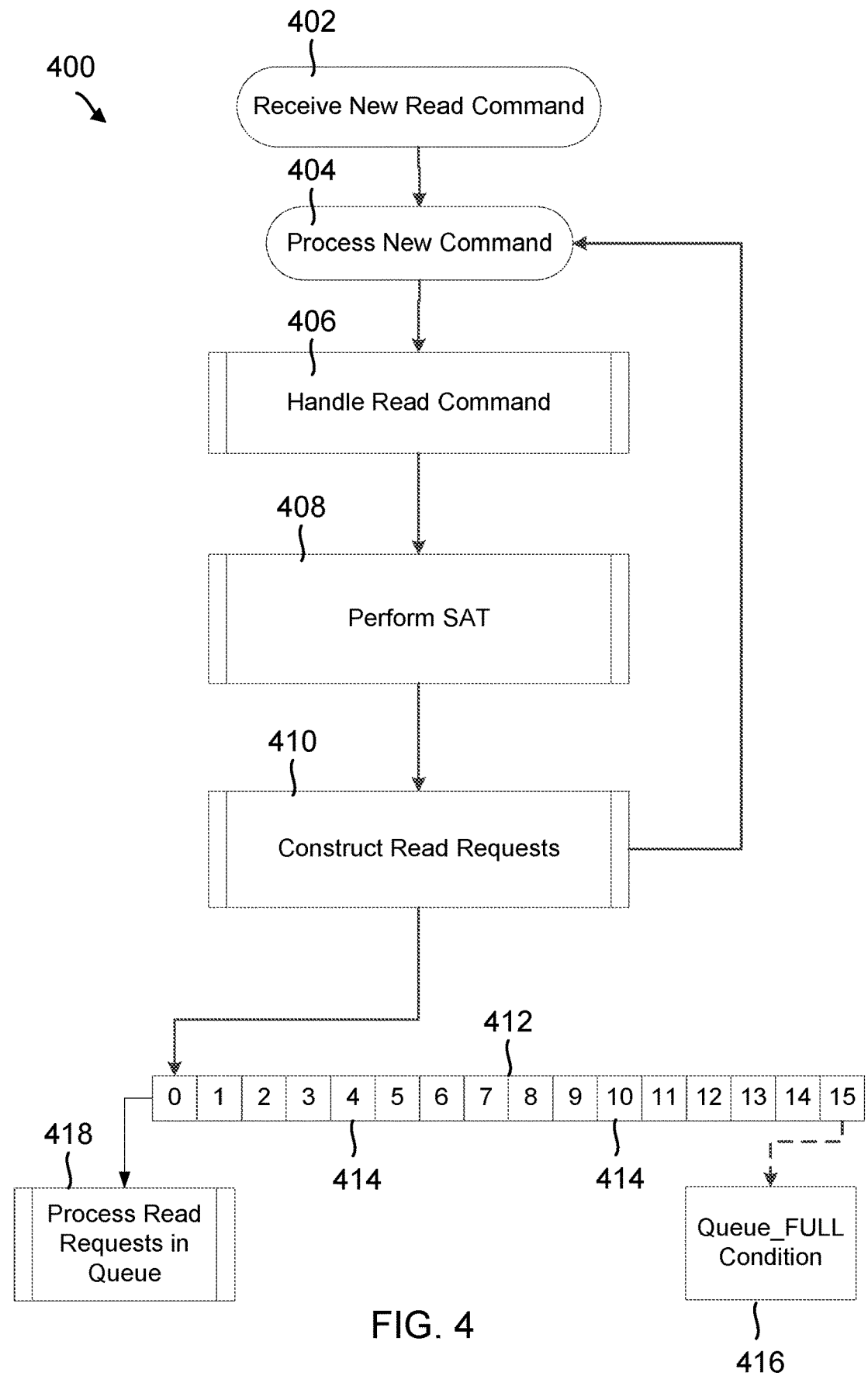
FIG. 4 is a flow chart illustrating a method of processing a read command by the storage device of FIG. 1.

FIG. 4 illustrates an example 400 of a process in which a controller (e.g. controller 123 including main processor 302 and physical sequencer 304) executes a read command from the host device 104. As represented by block 402, the controller may receive a new read command from the host device 104, and as represented by block 404, the controller may process the new command. For instance, referring to FIG. 3, the controller may receive a read command in a read queue of the host command queues 314 and proceed to process the command as described above while operating in a FML. For example, as represented by block 406, the controller may handle the read command, e.g. as part of a HRF, by identifying a logical address associated with the read command, and as represented by block 408, the controller may perform SAT by obtaining the physical address associated with the logical address identified from the read command (e.g. from L2P mapping table 120, 205). Then, as represented by block 410, the controller may construct read requests associated with the physical address for sending to a queue 412 to be processed by the physical sequencer. For instance, queue 412 may correspond to one of the queues in IPC queues 316. Each read request may also populate one entry 414 of the queue 412, which, as illustrated in FIG. 4, may include sixteen queue entries (corresponding to a thirty-two die NVM 110) or another number. Read requests may continue to be placed in the queue until a queue full condition 416 is reached (e.g. the queue is entirely populated). Finally, as represented by block 418, the controller may process the read requests in the queue 412. For instance, referring to FIG. 3, the physical sequencer 304 may receive each read request from the queue and transmit signals to sense the data 119 from the cells 116 (e.g. in 32 KB pages) associated with the physical address.

However, in cases where the read command has a large MDTS (e.g. 32 MB), or when repeated large sequential read commands are received, the queue 412 may quickly become full with read requests (e.g. 32 KB each), preventing other requests from being placed in the queue for processing (e.g. error reports or parity information requests, certain NVM commands, and power, thermal management, or internal file system operations). As a result, processing of requests may become blocked until the storage device 102 is reset during a power cycle.

Accordingly, to prevent the queue 412 from rapidly becoming overflowed with read requests for a large read command, the present disclosure provides flow control by allowing the controller (e.g. during the FML) to set a low resource mode in which the controller stops accepting new read commands from the host command queues 314 when the number of read requests in the queue 412 meets a threshold (e.g. close to the maximum queue size). Moreover, in mixed read patterns where short random commands may follow large sequential commands, the controller may balance the flow control so that short random commands are not delayed and may be simultaneously handled during processing of large sequential commands. While the flow control process described above refers to read commands, the process may be similarly applied for other commands such as write commands.

In one example, when the controller processes a new read command with a large MDTS, then rather than handling the entire command at once as described above with respect to FIG. 4, the controller may divide the command into portions and handle individual portions of the command. For instance, the controller may peek the command from the read queue (e.g. in host command queues 314) to determine a size of the command, and if the length of the command is greater than the portion size (e.g. greater than 512 KB or another number), the controller may handle up to that size of the command. For example, the controller may identify one or more logical addresses associated with the portion of the command (e.g. 512 KB of the 32 MB of requested data), perform a SAT to obtain the physical address corresponding to the identified logical addresses, and construct read requests for that portion of the command to read data located at the physical address (e.g. 32 KB at a time). The controller may then update the volatile memory 118 or the NVM 110 (e.g. using local variables) to indicate how much of the large command has been handled, and the controller may repeat the process for each portion of the command. Once the entire command has been handled, the command is popped from the read queue and the controller may move to the next command.

When the controller initially divides the command into portions and handles individual portions of the command, the controller may choose an initial portion size (e.g. 512 KB) that may dynamically change based upon queue utilization (e.g. of host command queues 314 and/or queue 412) in different read workloads. For example, the controller may determine, after handling multiple commands, that the rate at which new read commands are received from the host device has increased or decreased. If the rate has increased (i.e. read commands are being received more quickly), the controller may dynamically increase the portion size (e.g. to 1024 KB or a larger number) to pop commands faster and prevent the host command queues 314 from becoming too full. However, a limit may be imposed on the portion size to prevent queue 412 from also rapidly becoming full. Similarly, if the rate has decreased (i.e. read commands are being received more slowly), the controller may dynamically decrease the portion size (e.g. back to 512 KB or an even smaller number) to prevent queue 412 from rapidly becoming full with read requests. Thus, the read pipeline in NAND may be optimally controlled for different read workloads.

In another example, the controller may dynamically change the portion size based on a size of the command. For example, the controller may receive large commands of various sizes, e.g. 2 MB, 4 MB, 8 MB, 16 MB, 32 MB, etc. If the controller determines that the command size has increased in comparison to one or more prior commands, the controller may dynamically increase the portion size (e.g. to 1024 KB or a larger number) to pop commands faster and prevent the host command queues 314 from becoming too full. However, a limit may be imposed on the portion size to prevent queue 412 from also rapidly becoming full. Similarly, if the controller determines that the command size has decreased in comparison to one or more prior commands, the controller may dynamically decrease the portion size (e.g. back to 512 KB or an even smaller number) to prevent queue 412 from rapidly becoming full with read requests.

As the controller processes each portion of the command according to the dynamically determined portion size, the number of read requests in the queue 412 may meet a queue full threshold. Once the number of read requests meets the threshold, the controller may activate a low resource mode, e.g. by setting a restriction bitmap during the FML, to refrain from processing subsequent sequential commands and/or subsequent portions of an existing sequential command. This flow control may be imposed while the physical sequencer 304 processes the read requests until the number drops back below the threshold or alternatively the queue 412 becomes empty. At that point, the controller may clear the restriction to allow subsequent processing of new commands and/or portions of existing commands.

Moreover, to further optimize the flow control process, the controller may process short random commands while processing large sequential commands in the FML. For example, if the controller determines that a next command in the read queue of host command queues 314 is for random data (e.g. less than 512 KB, or alternatively less than the dynamically determined portion size), then the controller may pop the next command from the read queue and process the next command even when low resource mode is activated and construction of read requests for remaining portions of the current command is blocked. For example, if the queue 412 is not full, the controller may construct read requests for the next random command and place those read requests in the queue prior to completing the current sequential command.

Additionally, if there is no pending portion of the current command (e.g. a last portion of a sequential command is being processed or a random command is being processed), the flow control process may be further optimized. In such case, if the controller determines that the next command is for random data, the controller may process the next command after performing SAT for the current command or portion, rather than after the current command or portion has been fully handled. In this way, current and next commands may be handled simultaneously, e.g. the controller may construct and send read requests to the physical sequencer 304 for the current command or portion at the same time that the controller handles the next random command.

Figure 5:
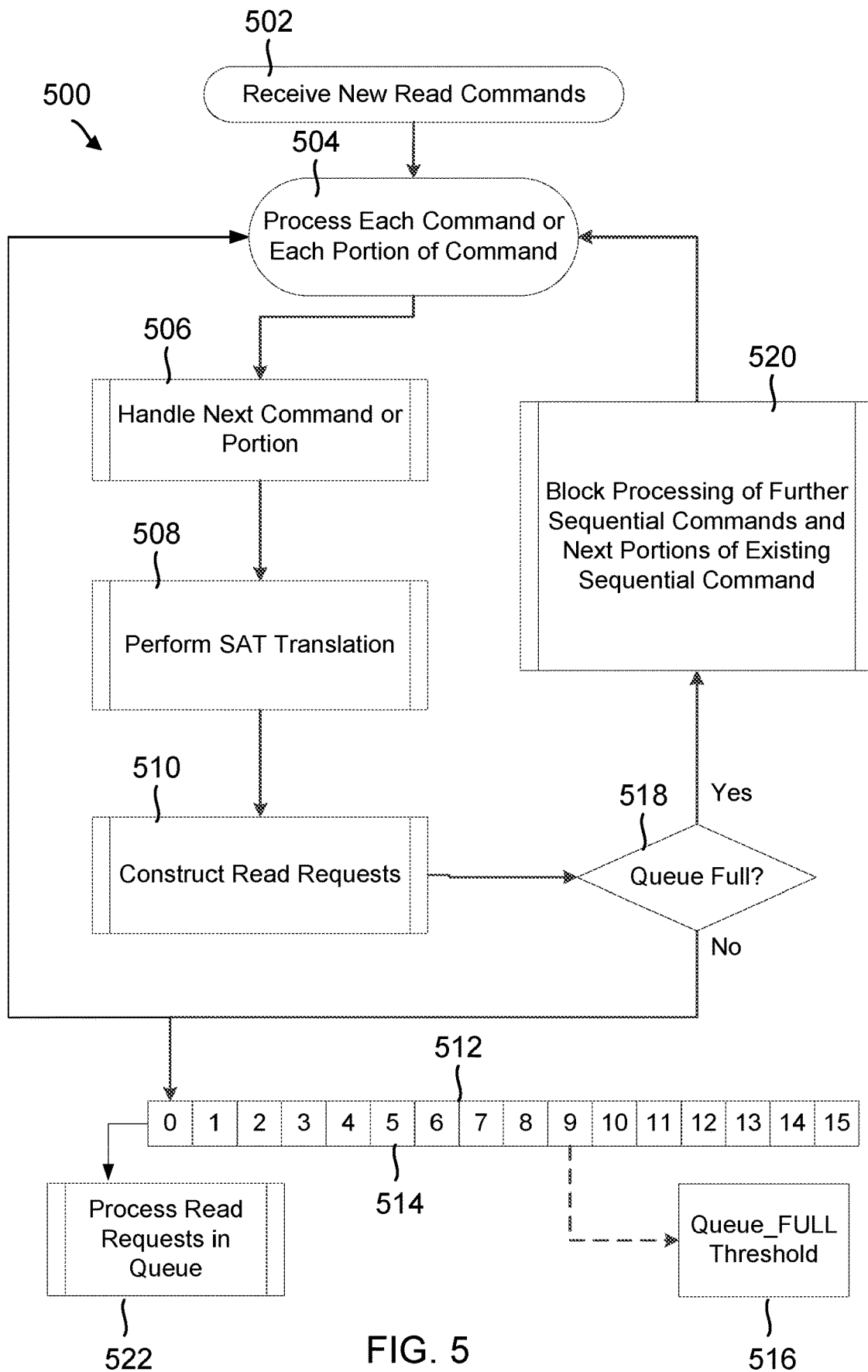
FIG. 5 is a flow chart illustrating an exemplary method of processing a read command using flow control by the storage device of FIG. 1.

FIG. 5 illustrates an example 500 of a process in which a controller (e.g. controller 123 including main processor 302 and physical sequencer 304) executes read commands from the host device 104 using flow control. As represented by block 502, the controller may receive a new read command from the host device 104, and as represented by block 504, the controller may process the new command or a portion of the new command depending on whether the command is a short (e.g. random) command or a large (e.g. sequential) command, respectively. For instance, referring to FIG. 3, the controller may receive a read command in a read queue of the host command queues 314, and if the controller determines that the command has a length greater than an initial or dynamically determined portion size (e.g. 512 KB), the controller may divide the command into portions and proceed to process each command portion as described above while operating in a FML; otherwise, the controller may process the command in its entirety. For example, as represented by block 506, the controller may handle the read command portion or command, e.g. as part of a HRF, by identifying a logical address associated with the portion or command, and as represented by block 508, the controller may perform SAT by obtaining the physical address associated with the logical address identified from the portion or command (e.g. from L2P mapping table 120, 205).

Then, as represented by block 510, the controller may construct read requests associated with the physical address for sending to a queue 512 to be processed by the physical sequencer. For instance, queue 512 may correspond to queue 412, with each read request populating one entry 514 of the queue 512 until a queue full threshold 516 is reached. The queue full threshold may be the maximum number of entries in the queue (e.g. queue full condition 416) or any number less than the maximum. For example the threshold may be triggered when nine read requests (or another configured number) have been stored in queue 512 as illustrated in FIG. 5. Accordingly, as represented by block 518, the controller may determine whether the number of read requests in the queue meets the queue full threshold 516. If the threshold has not been met, then the controller may store the read requests for the command portion or command into the queue 512. However, if the threshold has been met (e.g. nine read requests have been stored thus far in the queue in the illustrated example), then as represented by block 520, the controller may trigger a low resource mode in which the controller blocks processing of further command portions of the current command and next commands. As a result, the controller may refrain from storing read requests for remaining portions of the current command or new commands in the queue 512, thereby preventing overflowing of the queue and allowing room in the queue for other requests, e.g. error report or parity information requests, certain NVM command requests, and power, thermal management, or internal file system operation requests.

In the meanwhile, as represented by block 522, the controller may process the read requests in the queue 512. For instance, referring to FIG. 3, the physical sequencer 304 may receive each read request from the queue and transmit signals to sense the data 119 from the cells 116 (e.g. in 32 KB pages) associated with the physical address. Each read request may be popped from the queue 512 when processed. Once the number of read requests in the queue drop back below the queue full threshold 516, the controller may exit the low resource mode and continue to process further command portions of the current command and next commands as described above. For example, if the current command was determined to be a large sequential command, the controller may continue to process each portion of the command until all portions of the command have been executed as described above; otherwise, if the current command was determined to be a small random command, the controller may complete execution of the entire command. Once each command has been fully completed, the controller may pop the command from the read queue in host command queues 314 and move to the next command in the queue, repeating the above described process. Thus, the controller may activate and deactivate the low resource mode multiple times throughout the processing to provide flow control and complete processing of multiple large sequential commands.

Figure 6:
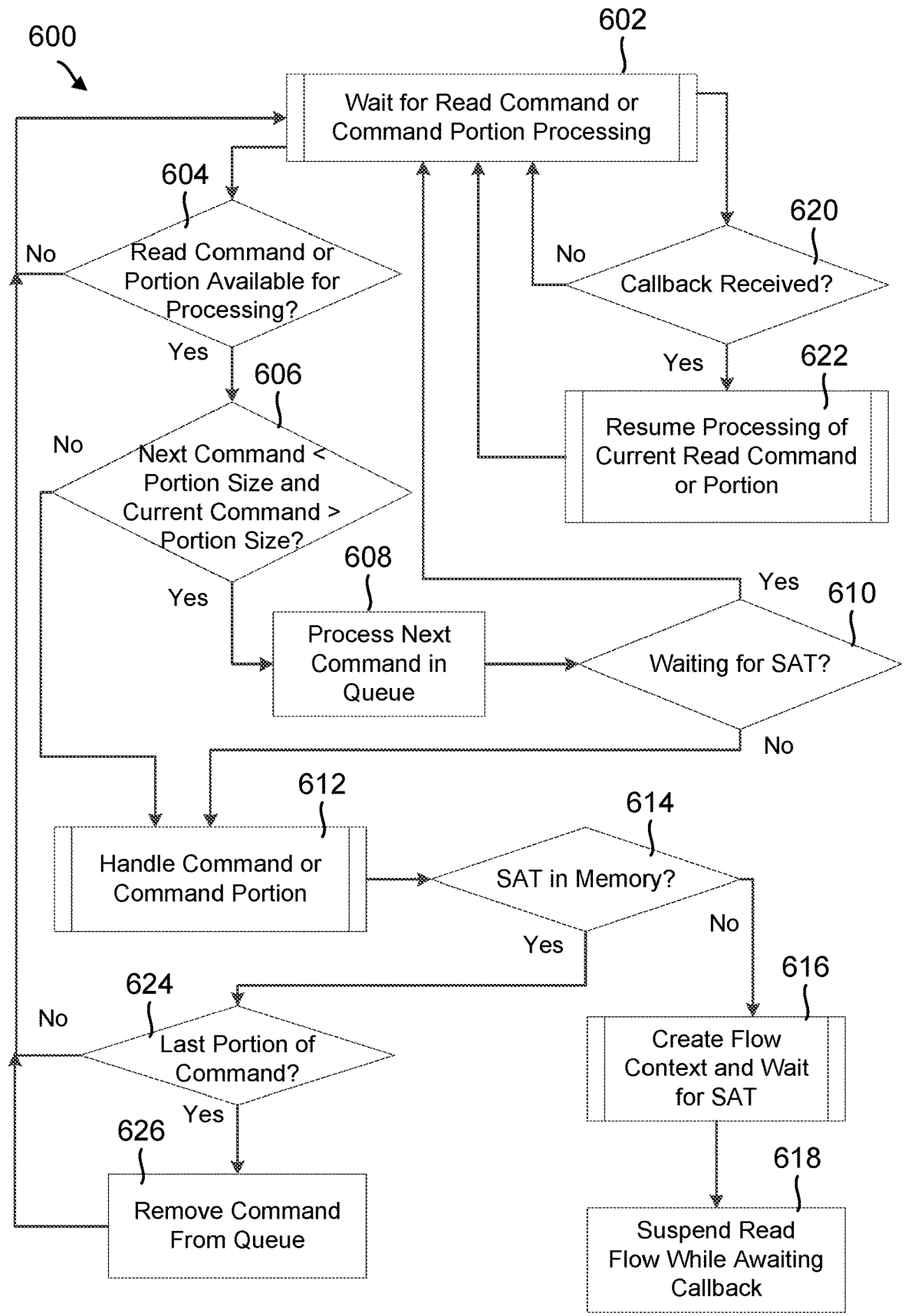
FIG. 6 is a flow chart illustrating another method of processing a read command by the storage device of FIG. 1.

FIG. 6 illustrates an example 600 of another process in which a controller (e.g. controller 123 including main processor 302 and physical sequencer 304) executes read commands from the host device 104 using flow control. As represented by block 602, the controller may wait for a read command or read command portion to process. For instance, referring to FIG. 3, the FTL 306 of the controller may operate in a FML in which the FTL may wait for messages received in queues 312, 314, 316 and process them in the order the messages are received. Thus, if the FTL 306 receives a read command from the host command queue 314 while in the FML, the FTL may process the read command as described above. For example, as represented by block 604, the controller may determine whether a read command or portion is available to be processed by identifying whether a short (e.g. random) command or a large (e.g. sequential) command is next to be read in the host command queue. For instance, referring to FIG. 3, the controller may receive a read command in a read queue of the host command queues 314, and if the controller determines that the command has a length greater than an initial or dynamically determined portion size (e.g. 512 KB), the controller may divide the command into portions and proceed to process each command portion as described above while operating in the FML, otherwise, the controller may process the command in its entirety.

However, in some cases the controller may already be in the low resource mode, or may soon activate the low resource mode due to the size of the current command as described above with respect to FIG. 5. For example, the controller may be currently executing a large sequential command, and therefore the number of read requests in the queue 512 may have already met, or will soon meet, the queue full threshold 516. In such case, blocking processing of the current command, and of subsequent large commands, may serve to prevent queue overflow with read requests and sustain performance of the storage device 102. However, if the next read command in the host command queue is a smaller command (e.g. for random data), the controller may be able to process the next command and construct read requests without overflowing the queue. For example, even if queue full threshold 516 has been met by read requests for a current portion of a large command, there may still be room in the queue 512 for read requests for the subsequent small command. Thus, the controller may further optimize flow control by allowing processing of short random commands even when blocking current and next large sequential commands.

Accordingly, before proceeding to process the current command or command portion, as represented by block 606, the controller may determine whether the next read command in the host command queue has a length less than or equal to the initial or dynamically determined portion size (e.g. 512 KB). For instance, the controller may peek the next command from the read queue in host command queues 314, and the controller may determine based on the command size that the next command is a short random command. In such case, if the controller is currently processing a portion of a command (e.g. a large sequential command, and thus low resource mode may be activated or likely to activate), then as represented by block 608, the controller may process the next command in the host command queue. For example, the controller may pop the next command from the read queue (e.g. after popping the current command from the queue and updating the volatile memory 118 or NVM 110 using local variables to indicate how much of the large command has been handled), identify a logical address associated with the next command, perform a SAT to obtain a physical address corresponding to the identified logical address, and construct read requests associated with the physical address to be processed by the physical sequencer 304. After the next command is fully handled, the controller may continue to process the remaining portions of the earlier sequential command.

Additionally, in some cases, the controller may currently be processing the last portion of a sequential command, or the last (e.g. only) portion of a random command. In such case, when the controller processes the next random command at block 608, the controller may further repeat the above process by peeking an additional subsequent command from the read queue in host command queues 314. If the controller also determines the additional command to be small (e.g. having a length less than or equal to the initial or dynamically determined portion size), then the controller may further optimize flow control by processing the subsequent command after obtaining the SAT for the current command, as opposed to after constructing the read requests for the current command as described above. For example, while the controller waits for the SAT to be performed, as represented by block 610, the controller may continue waiting in the FML loop (at block 602) until the SAT is obtained, after which the controller may process the additional command simultaneously with constructing read requests for the current command by identifying a logical address associated with the additional command and performing a SAT to obtain a physical address corresponding to the identified logical address. In this way, short random commands may be simultaneously handled with large read commands even during the low resource mode.

When processing the current command or portion (e.g. when the next command is large, as determined at block 606), or the next or additional command (e.g. when a SAT is not pending, as determined at block 610), then as represented by block 612, the controller may begin by handling the command or portion, e.g. as part of a HRF. For example, if the command is large, the controller may divide the command into portions as described above, and if the first portion is being handled, the controller may create a flow manager (FMG) context for that command in which the controller may store information regarding the current command (e.g. the current read offset and the sectors of the portion(s) remaining to be processed). The controller may also identify one or more logical addresses associated with the command or portion, and as represented by block 614, the controller may determine whether the SAT is already in memory (e.g. the L2P mapping for that logical address is currently in cache 122 or RAM, or was previously obtained at block 610). If the SAT is not in memory, then after storing information regarding the current command in the created FMG context, the controller may wait for the SAT to be performed, as represented by block 616. For instance, the controller may call an SAT application programming interface (API), and as represented by block 618, the controller may suspend the read flow for the command or portion while the SAT is being obtained. The controller may then wait in the FML loop (e.g. at block 602) until a callback from the SAT API is received, as represented by block 620, at which point the controller may resume processing of the current read command or portion, as represented by block 622. For example, the controller may extract the information (e.g. the read offset) stored in the FMG context for the current command, and the controller may proceed to construct read requests to be sent to the physical sequencer 304 for execution after obtaining the physical address.

If the controller determines at block 614 that the SAT is in memory (e.g. the SAT had already been obtained), then after fully processing the command or portion as described above, the controller may determine, as represented by block 624, whether there are remaining portions or sectors of the command to process. If the controller determines that there are portions remaining to be processed, the controller may repeat the above steps to handle each portion of the command. Otherwise, if the controller determines that the last portion has been processed, then as represented by block 626, the controller may remove the command from the queue and move to the next command for processing.

Figure 7:
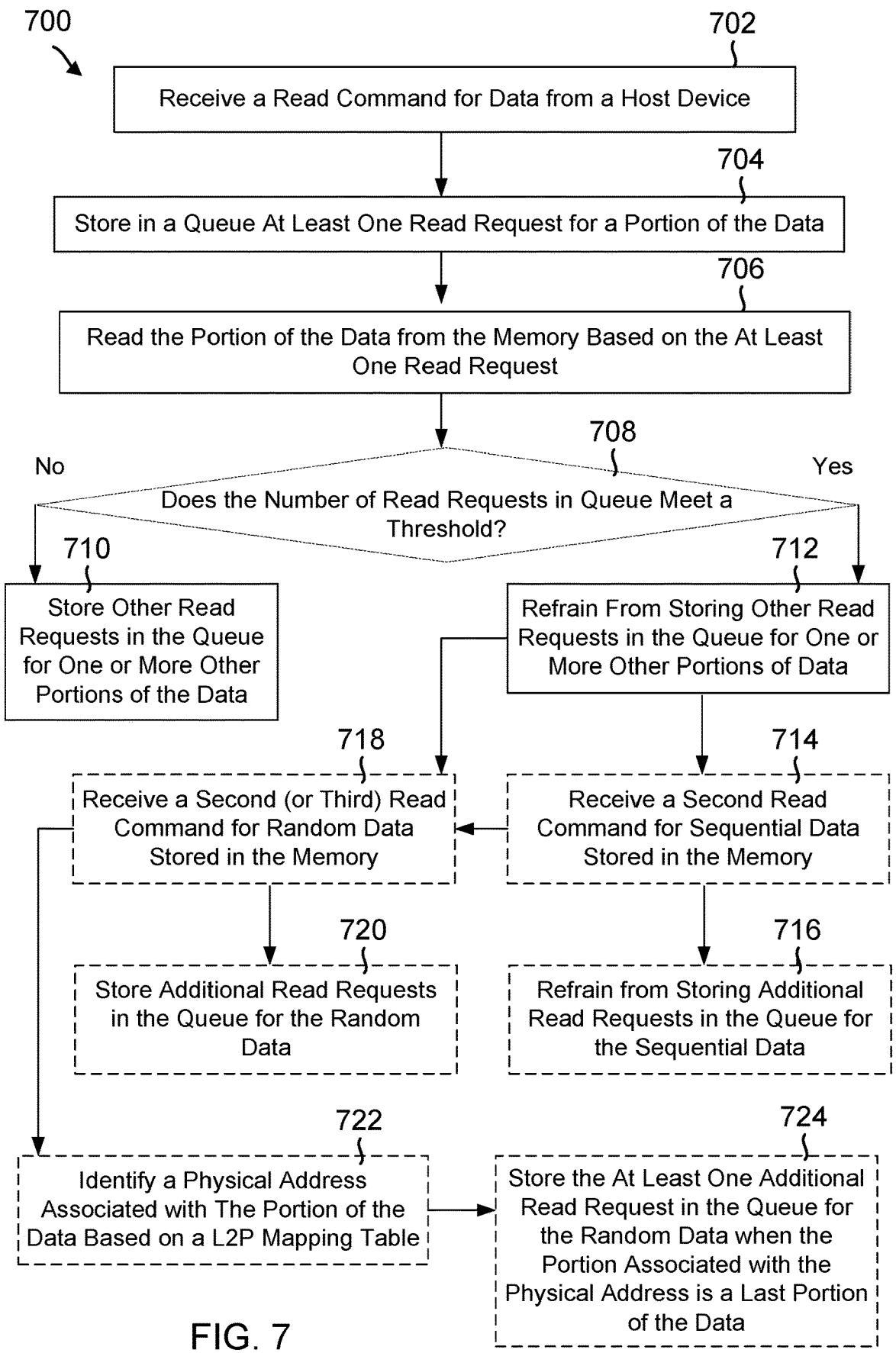
FIG. 7 is a flow chart illustrating a further method of processing read commands by the storage device of FIG. 1.

FIG. 7 illustrates an example flow chart 700 of a method for processing read commands with flow control. For example, the method can be carried out in a storage device 102 such as the one illustrated in FIG. 1. Each of the steps in the flow chart can be controlled using the controller as described below (e.g. controller 123), or by some other suitable means.

As represented by block 702, the controller receives a read command for data from a host device. For example, referring to FIGS. 1 and 5, as represented by block 502, the controller 123 may receive a new read command for data 119 stored in the NVM 110 from the host device 104. For instance, referring to FIG. 3, the controller may receive a read command in a read queue of the host command queues 314.

As represented by block 704, the controller stores in a queue at least one read request for a portion of the data. For example, referring to FIGS. 1 and 5, as represented by block 510, the controller 123 may construct read requests to be stored in a queue 512 (e.g. queue 412 or one of the IPC queues 316) for reading a portion of the data 119. Referring to FIG. 3, after the controller receives a read command in a read queue of the host command queues 314, if the controller determines that the command has a length greater than an initial or dynamically determined portion size (e.g. 512 KB), the controller may divide the command into portions of the aforementioned portion size and proceed to process each command portion. For instance, as represented by block 506, the controller may handle the read command portion by identifying a logical address associated with the portion, and as represented by block 508, the controller may perform SAT by obtaining the physical address associated with the logical address identified from the portion (e.g. from L2P mapping table 120, 205). Afterwards, as represented by block 510, the controller may construct the read requests associated with the physical address for that portion, and the controller may store the read requests in the queue 512 to be processed by the physical sequencer 304.

In one example, the portion of the data may be based on a rate at which read commands are received from the host device. For instance, referring to FIG. 4, when the controller initially divides the command into portions and handles individual portions of the command, the controller may choose an initial portion size (e.g. 512 KB) that may dynamically change based upon queue utilization (e.g. of host command queues 314 and/or queue 412) in different read workloads. For example, the controller may determine, after handling multiple commands, that the rate at which new read commands are received from the host device has increased or decreased. If the rate has increased (i.e. read commands are being received more quickly), the controller may dynamically increase the portion size (e.g. to 1024 KB or a larger number) to pop commands faster and prevent the host command queues 314 from becoming too full. However, a limit may be imposed on the portion size to prevent queue 412 from also rapidly becoming full. Similarly, if the rate has decreased (i.e. read commands are being received more slowly), the controller may dynamically decrease the portion size (e.g. back to 512 KB or an even smaller number) to prevent queue 412 from rapidly becoming full with read requests.

In another example, the portion of the data may be based on a length of the read command. For example, referring to FIG. 4, the controller may dynamically change the portion size based on a size of the command. For instance, the controller may receive large commands of various sizes, e.g. 2 MB, 4 MB, 8 MB, 16 MB, 32 MB, etc. If the controller determines that the command size has increased in comparison to one or more prior commands, the controller may dynamically increase the portion size (e.g. to 1024 KB or a larger number) to pop commands faster and prevent the host command queues 314 from becoming too full. However, a limit may be imposed on the portion size to prevent queue 412 from also rapidly becoming full. Similarly, if the controller determines that the command size has decreased in comparison to one or more prior commands, the controller may dynamically decrease the portion size (e.g. back to 512 KB or an even smaller number) to prevent queue 412 from rapidly becoming full with read requests.

As represented by block 706, the controller reads the portion of the data from a memory based on the at least one read request. For example, referring to FIGS. 1 and 5, as represented by block 510, the controller 123 may construct read requests associated with the physical address for sending to the queue 512 to be processed by the physical sequencer. For instance, referring to FIG. 3, the physical sequencer 304 may receive each read request from the queue and transmit signals to sense the data 119 from the cells 116 (e.g. in 32 KB pages) associated with the physical address.

As represented by block 708, the controller determines whether a number of the at least one read request in the queue meets a threshold. If the number of read requests does not meet the threshold, then as represented by block 710, the controller may store other read requests in the queue for one or more other portions of the data. On the other hand, if the number of read requests meets the threshold, then as represented by block 712, the controller may refrain from storing the other read requests in the queue for the one or more other portions of the data. The threshold may be less than a maximum size for the queue. For example, referring to FIGS. 1 and 5, each read request constructed by the controller may populate one entry 514 of the queue 512 until a queue full threshold 516 is reached. The queue full threshold may be the maximum number of entries in the queue, or any number less than the maximum. For example the threshold may be triggered when nine read requests (or another configured number) have been stored in queue 512 as illustrated in FIG. 5. Accordingly, as represented by block 518, the controller may determine whether the number of read requests in the queue meets the queue full threshold 516. If the threshold has not been met, then the controller may store the read requests for the command portion or command into the queue 512. However, if the threshold has been met, then as represented by block 520, the controller may trigger a low resource mode in which the controller refrains from storing read requests for remaining portions of the current command or new commands in the queue 512. In the meanwhile, as represented by block 522, the controller may process the read requests in the queue 512. Once the number of read requests in the queue drops back below the queue full threshold 516, the controller may exit the low resource mode and continue to process further command portions of the current command and next commands as described above.

As represented by block 714, after receiving the read command at block 702, the controller may receive a second read command for sequential data stored in the memory. Moreover, as represented by block 716, the controller may refrain from storing additional read requests in the queue for the sequential data when the number of the at least one read request in the queue meets the threshold. For example, referring to FIGS. 1, 3, and 5, the controller may receive multiple sequential read commands (e.g. a first and second command) in a read queue of the host command queues 314. As the controller processes each portion of the first command according to the dynamically determined portion size, the number of read requests in the queue 512 may meet the queue full threshold 516. Once the number of read requests meets the threshold, the controller may activate the low resource mode, e.g. by setting a restriction bitmap in the FML, to refrain from processing the second command and other subsequent sequential commands, as well as existing portions of the current command. This flow control may be imposed while the physical sequencer 304 processes the read requests until the number drops back below the threshold or alternatively the queue 412 becomes empty.

As represented by block 718, after receiving the read command at block 702, the controller may receive a second read command for random data stored in the memory. The controller may also receive the read command for random data before or after receiving the read command for sequential data at block 714 (i.e. as a third read command). Moreover, as represented by block 720, the controller may store at least one additional read request in the queue for the random data when the number of the at least one read request in the queue meets the threshold. For instance, referring to FIGS. 1, 3, and 4, the controller 123 may process short random commands while processing large sequential commands in the FML. For example, if the controller determines that a next command in the read queue of host command queues 314 is for random data (e.g. less than 512 KB, or alternatively less than the dynamically determined portion size), then the controller may pop the next command from the read queue and process the next command even when low resource mode is activated and construction of read requests for remaining portions of the current command is blocked. For example, if the queue 412 is not full, the controller may construct read requests for the next random command and place those read requests in the queue prior to completing the current sequential command.

As another example, referring to FIGS. 1, 3, 5, and 6, the controller 123 may receive a next read command in the host command queue 314 which is a smaller command (e.g. for random data) than a currently blocked, large sequential command. In such case, even if queue full threshold 516 has been met by read requests for a current portion of the large command, there may still be room in the queue 512 for read requests for the subsequent small command. Accordingly, if the controller determines at block 606 that the next read command in the host command queue has a length less than or equal to the initial or dynamically determined portion size (e.g. 512 KB), then as represented by block 608, the controller may process the next command in the host command queue. For example, the controller may pop the next command from the read queue, identify a logical address associated with the next command, perform a SAT to obtain a physical address corresponding to the identified logical address, and construct and store read requests associated with the physical address in queue 512 to be processed by the physical sequencer 304 for reading the random data.

Finally, as represented by block 722, the controller may identify a physical address associated with the portion of the data (received at block 702) based on a L2P mapping table. Moreover, as represented by block 724, the controller may store the at least one additional read request in the queue for the random data in response to identifying the physical address when the portion associated with the physical address is a last portion of the data. For instance, referring to FIGS. 1, 3, and 4, if there is no pending portion of the current command (e.g. a last portion of a sequential command is being processed or a random command is being processed), the flow control process may be further optimized. In such case, if the controller determines that the next command is for random data, the controller may process the next command after performing SAT for the current command or portion, rather than after the current command or portion has been fully handled. In this way, current and next commands may be handled simultaneously, e.g. the controller may construct and send read requests to the physical sequencer 304 for the current command or portion at the same time that the controller handles the next random command.

As another example, referring to FIGS. 1, 3, and 6, when the controller 123 processes the next random command at block 608, the controller may further repeat the above process by peeking an additional subsequent command from the read queue in host command queues 314. If the controller also determines the additional command to be small (e.g. having a length less than or equal to the initial or dynamically determined portion size), then the controller may further optimize flow control by processing the subsequent command after obtaining the SAT for the current command, as opposed to after constructing the read requests for the current command as described above. For example, while the controller waits for the SAT to be performed, as represented by block 610, the controller may continue waiting in the FML loop (at block 602) until the SAT is obtained, after which the controller may process the additional command simultaneously with constructing read requests for the current command by identifying a logical address associated with the additional command and performing a SAT to obtain a physical address corresponding to the identified logical address. The controller may then construct and store read requests associated with the physical address for the additional command in queue 512 to be processed by the physical sequencer 304 for reading the random data.

Accordingly, the present disclosure allows for a storage device which receives sequential read commands with large MDTS (e.g. 32 MB of video data) from a host device to process multiple read requests in an IPC queue without being stalled and impacting sequential and random read performance. In this way, the storage device may also complete error handling during processing of the large sequential commands. Moreover, commands may be divided into portions which are dynamically determined based on queue utilization in different read workloads and based on different sizes of read commands, further optimizing handling of large sequential read commands. Additionally, short random commands may be processed along with large sequential reads to accommodate mixed read (e.g. sequential and random) workloads.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
   a memory configured to store data; and
   a controller configured to receive, from a host device, a first read command having a first command length for the data, to store at least one read request associated with the first read command into a queue for a portion of the data, and to read the portion of the data from the memory based on the at least one read request,
   wherein the controller is further configured to store other read requests associated with the first read command into the queue for one or more other portions of the data when a number of read requests associated with the first read command in the queue does not meet a threshold, to refrain from storing the other read requests associated with the first read command into the queue when the number of read requests associated with the first read command in the queue meets the threshold, and to process a second read command having a second command length smaller than the first command length when the number of read requests associated with the first read command in the queue meets the threshold.

2. The storage device of claim 1, wherein the controller is further configured, after receiving the first read command, to receive a third read command having a third command length that corresponds to the first command length for sequential data stored in the memory, and to refrain from storing one or more read requests associated with the third read command into the queue for the sequential data when the number of read requests associated with the first read command in the queue meets the threshold.

3. The storage device of claim 1, wherein the controller is further configured, after receiving the first read command, to receive the second read command for random data stored in the memory, and to store one or more read requests associated with the second read command into the queue for the random data when the number of read requests associated with the first read command in the queue meets the threshold.

4. The storage device of claim 3, wherein the controller is further configured to identify a physical address associated with the portion of the data based on a logical-to-physical (L2P) mapping table, and wherein the controller is further configured to store the one or more read requests associated with the second read command into the queue for the random data in response to identifying the physical address when the portion associated with the physical address is a last portion of the data.

5. The storage device of claim 1, wherein the threshold is less than a maximum size for the queue.

6. The storage device of claim 1, wherein the portion of the data is based on a rate at which the first read command is received from the host device.

7. The storage device of claim 1, wherein the portion of the data is based on the first command length of the first read command.

8. A storage device, comprising:
   a memory configured to store first data and second data; and
   a controller configured to receive, from a host device, a first read command having a first command length for the first data, to receive, from the host device, a second read command having a second command length that corresponds to the first command length for the second data after receiving the first read command, to store at least one read request associated with the first read command into a queue for a portion of the first data, and to read the portion of the first data from the memory based on the at least one read request associated with the first read command,
   wherein the controller is further configured to store one or more read requests associated with the second read command into the queue for the second data when a number of read requests associated with the first read command in the queue does not meet a threshold, to refrain from storing the one or more read requests associated with the second read command into the queue for the second data when the number of read requests associated with the first read command in the queue meets the threshold, and to process a third read command having a third command length smaller than the first command length when the number of read requests associated with the first read command in the queue meets the threshold.

9. The storage device of claim 8, wherein the second data comprises sequential data.

10. The storage device of claim 8, wherein the controller is further configured, after receiving the first read command and before receiving the second read command, to receive the third read command for random data stored in the memory, and to store at least one read request associated with the third read command into the queue for the random data when the number of read requests associated with the first read command in the queue meets the threshold.

11. The storage device of claim 10, wherein the controller is further configured to identify a physical address associated with the portion of the first data based on a logical-to-physical (L2P) mapping table, and wherein the controller is further configured to store the one or more read requests associated with the third read command into the queue for the random data in response to identifying the physical address when the portion associated with the physical address is a last portion of the first data.

12. The storage device of claim 8, wherein the threshold is less than a maximum size for the queue.

13. The storage device of claim 8, wherein the portion of the first data is based on a rate at which the first read command is received from the host device.

14. The storage device of claim 8, wherein the portion of the first data is based on the first command length of the first read command.

15. A storage device, comprising:
   a memory configured to store first data and second data; and
   a controller configured to receive, from a host device, a first read command having a first command length for the first data, to receive, from the host device, a second read command having a second command length smaller than the first command length for the second data after receiving the first read command, to store at least one read request associated with the first read command into a queue for a portion of the first data, and to read the portion of the first data from the memory based on the at least one read request associated with the first read command,
   wherein the controller is further configured to refrain from storing other read requests associated with the first read command into the queue and process the second read command by storing at least one read request associated with the second read command into the queue for the second data, when a number of read requests associated with the first read command in the queue meets a threshold.

16. The storage device of claim 15, wherein the second data comprises random data.

17. The storage device of claim 15, wherein the controller is further configured, after receiving the first read command and before receiving the second read command, to receive a third read command for sequential data stored in the memory, and to refrain from storing at least one read request associated with the third read command into the queue for the sequential data when the number of read requests associated with the first read command in the queue meets the threshold.

18. The storage device of claim 15, wherein the controller is further configured to identify a physical address associated with the portion of the first data based on a logical-to-physical (L2P) mapping table, and wherein the controller is further configured to store the at least one read request associated with the second read command into the queue for the second data in response to identifying the physical address when the portion associated with the physical address is a last portion of the first data.

19. The storage device of claim 15, wherein the threshold is less than a maximum size for the queue.

20. The storage device of claim 15, wherein the portion of the first data is based on at least one of a rate at which the first read command is received from the host device or the first command length of the first read command.

* * * * *